US011030011B2

(12) United States Patent
Netto et al.

(10) Patent No.: US 11,030,011 B2
(45) Date of Patent: *Jun. 8, 2021

(54) USER INTERFACE AND SYSTEM SUPPORTING USER DECISION MAKING AND READJUSTMENTS IN COMPUTER-EXECUTABLE JOB ALLOCATIONS IN THE CLOUD

(71) Applicant: International Business Machines Corporation, Armonk, NY (US)

(72) Inventors: Marco A. S. Netto, Sao Paulo (BR); Nicole B. Sultanum, Sao Paulo (BR); Renato L. d. F. Cunha, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,005

(22) Filed: Nov. 27, 2019

(65) Prior Publication Data

US 2020/0097330 A1 Mar. 26, 2020

Related U.S. Application Data

(63) Continuation of application No. 15/989,276, filed on May 25, 2018, now Pat. No. 10,552,223, which is a
(Continued)

(51) Int. Cl.
*G06F 9/50* (2006.01)
*G06F 9/48* (2006.01)
*G06Q 10/06* (2012.01)

(52) U.S. Cl.
CPC .......... *G06F 9/5038* (2013.01); *G06F 9/4881* (2013.01); *G06F 9/5055* (2013.01); *G06F 9/5077* (2013.01); *G06Q 10/06311* (2013.01)

(58) Field of Classification Search
CPC .... G06F 9/4881; G06F 9/5038; G06F 9/5055; G06F 9/5077; G06Q 10/06311
See application file for complete search history.

(56) References Cited

U.S. PATENT DOCUMENTS 6,546,364 B1    4/2003  Smirnov et al.
8,458,011 B2    6/2013  Al-Dawsari et al.
(Continued)

FOREIGN PATENT DOCUMENTS

CN    103455375 A    12/2013
EP    2609502         7/2013
(Continued)

OTHER PUBLICATIONS

"NIST Cloud Computing Program", csrc.nist.gov/groups/SNS/cloud-computing/index.html, printed on Oct. 26, 2015, 2 pages.
(Continued)

*Primary Examiner* — Jorge A Chu Joy-Davila
(74) *Attorney, Agent, or Firm* — Scully, Scott, Murphy & Presser, P.C.; Joseph Petrokaitis

(57) ABSTRACT

A visual tool may be provided to display information associated with computer job allocation and to allow a user to explore different job configurations. Jobs executing on a computing environment comprising a shared pool of configurable computing resources may be monitored. Cost and duration estimates may be determined with uncertainty associated with the cost and duration estimates. Sandbox environment may be provided that allow users to manipulate one or more different job configuration options for executing the jobs in the computing environment.

17 Claims, 7 Drawing Sheets

Related U.S. Application Data continuation of application No. 14/924,354, filed on Oct. 27, 2015, now Pat. No. 10,067,798.

(56) References Cited

U.S. PATENT DOCUMENTS

| | | |
|---|---|---|
| 8,607,242 B2 | 12/2013 | Clarke |
| 8,825,710 B2 | 9/2014 | Gillen et al. |
| 8,849,971 B2 | 9/2014 | Ferris |
| 8,972,578 B2 | 3/2015 | Mitchell et al. |
| 2006/0224432 A1 | 10/2006 | Li |
| 2008/0255910 A1 | 10/2008 | Bagchi et al. |
| 2009/0055520 A1 | 2/2009 | Tabata et al. |
| 2010/0076856 A1 | 3/2010 | Mullins et al. |
| 2011/0078303 A1 | 3/2011 | Li et al. |
| 2011/0119604 A1 | 5/2011 | Lo et al. |
| 2011/0131499 A1 | 6/2011 | Ferris et al. |
| 2011/0173626 A1 | 7/2011 | Chi et al. |
| 2011/0302090 A1 | 12/2011 | Newpol et al. |
| 2012/0016721 A1 | 1/2012 | Weinman |
| 2012/0079409 A1 | 3/2012 | Luo et al. |
| 2012/0131591 A1 | 5/2012 | Moorthi et al. |
| 2012/0173709 A1 | 7/2012 | Li et al. |
| 2013/0007753 A1 | 1/2013 | Jain |
| 2015/0012323 A1* | 1/2015 | Guerinik ............ G06Q 10/1097 705/7.21 |

FOREIGN PATENT DOCUMENTS

| | | |
|---|---|---|
| WO | WO2012006638 A1 | 1/2012 |
| WO | WO2012027478 A1 | 3/2012 |

OTHER PUBLICATIONS

Tsafrir, D., et al., "Backfilling Using System-Generated Predictions Rather than User Runtime Estimates", IEEE Transactions on Parallel and Distributed Systems, Jun. 2007, pp. 789-803, vol. 18, No. 6.

Yang, L. T., et al., "CrossPlafform Performance Prediction of Parallel Applications Using Partial Execution", SC/05, ACM, Nov. 12-18, 2005, 11 pages.

List of IBM Patents or Patent Applications Treated as Related, dated Nov. 27, 2019, 2 pages.

* cited by examiner

USER INTERFACE AND SYSTEM SUPPORTING USER DECISION MAKING AND READJUSTMENTS IN COMPUTER-EXECUTABLE JOB ALLOCATIONS IN THE CLOUD

FIELD

The present application relates generally to computers and computer applications, and more particularly to computer-implemented techniques that support readjustments in computer job execution allocations.

BACKGROUND

Maintaining, monitoring and readjusting jobs in computer system infrastructures such as cloud infrastructures can be very challenging. Users have diverse constraints when it comes to pricing and turnaround time, and pre-packaged configurations are often too limited to cover all possible variations. The uncertainty involved in turnaround times and in the resource availability itself makes it very difficult to properly estimate alternatives. In the end, users have a difficult experience envisioning how their jobs could perform in different configurations. With the lack of proper estimation tools, users potentially miss on more cost-beneficial configuration alternatives.

The present disclosure discloses a tool to allow users extra awareness of their jobs running in computer system infrastructures such as cloud infrastructures, awareness on the uncertainty involved in time/cost allocation, and the possibility of manually experimenting with different configurations that are not covered by pre-packaged job allocation profiles.

BRIEF SUMMARY

A computer-implemented method and system of providing a user interface supporting user decision making and readjusting of computer job execution allocations may be provided. The method may include receiving a list of computer executable jobs for execution on a computing environment comprising a shared pool of configurable computing resources. The method may also include receiving one or more user preferences and constraints associated with the list of computer jobs. The method may further include generating a plurality of execution scheduling options for the list of computer executable jobs. The method may also include displaying on a display device via a user interface, the plurality of execution scheduling options. The method may further include receiving a user selection of an execution scheduling option from the plurality of execution scheduling options. The method may further include monitoring execution of the computer executable jobs allocated in the execution scheduling option selected by the user. The method may also include monitoring resource status of the computing environment while the computer executable jobs are executing. The method may further include determining estimation of time and cost of running one or more of the computer executable jobs based on the monitoring of the execution and the resource status. The method may also include determining uncertainty associated with the estimation of time and cost at least based on analyzing internal computing structures associated with historical jobs. The method may also include updating visualization associated with the plurality of execution scheduling options on the display device with updates based on the estimation of time and cost and the uncertainty.

A system of providing a user interface supporting user decision making and readjusting of computer job execution allocations, in one aspect, may include one or more processors operable to receive a list of computer executable jobs for execution on a computing environment comprising a shared pool of configurable computing resources. One or more of the processors may be further operable to receive one or more user preferences and constraints associated with the list of computer jobs. One or more of the processors may be further operable to generate a plurality of execution scheduling options for the list of computer executable jobs. A storage device coupled to one or more of the processors may be operable to store the plurality of execution scheduling options. A user interface may be operable to display on a display device, the plurality of execution scheduling options, the user interface further operable to receive a user selection of an execution scheduling option from the plurality of execution scheduling options. One or more of the processors may be further operable to monitor execution of the computer executable jobs allocated in the execution scheduling option selected by the user. One or more of the processors may be further operable to monitor resource status of the computing environment while the computer executable jobs are executing. One or more of the processors may be further operable to determine estimation of time and cost of running one or more of the computer executable jobs based on the monitoring of the execution and the resource status. One or more of the processors may be further operable to determine uncertainty associated with the estimation of time and cost at least based on analyzing internal computing structures associated with historical jobs. The user interface may be further operable to update visualization associated with the plurality of execution scheduling options on the display device with updates based on the estimation of time and cost and the uncertainty.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
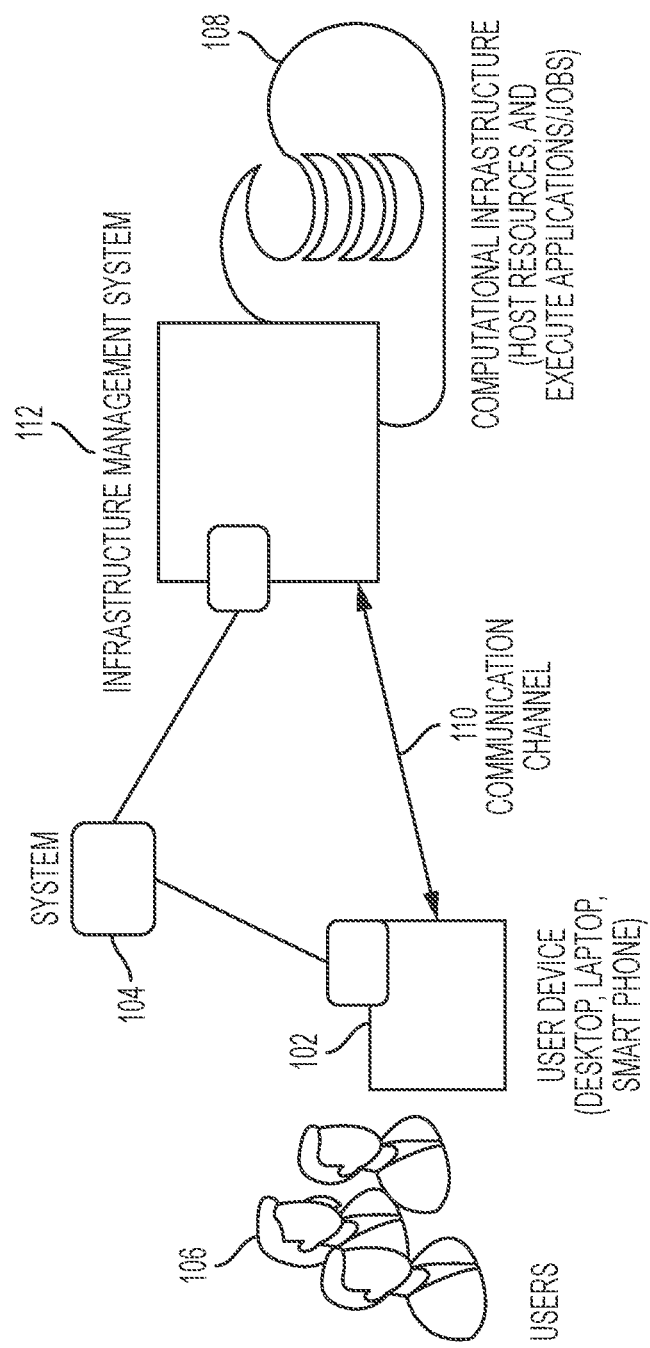
FIG. 1 is a diagram illustrating components of a system in one embodiment of the present disclosure.

A tool, for example, a system, method and apparatus may be provided to support user decision-making and readjustments in computer-executed job allocations in computer system infrastructures such as the cloud. In one embodiment, a visual and interactive graphical user interface steering system may be provided to view, explore and modify configurations of resource allocation for computer-executed jobs running on a computer infrastructure such as cloud infrastructure. Visualization aids users in capturing more information in a glance about their computer-executed jobs, which is especially useful when a large number of computer-executed jobs needs to be maintained and the estimations of job execution times are not precise.

It is understood in advance that although this disclosure includes a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The cloud computing paradigm may be different from other computing domains, for example, in that the cloud can be viewed to an extent as having infinite scalability. For instance, while in traditional projects managers are constrained by the number of resources to perform a task, in the cloud one can assign as many resources as one may want to perform a task. Releasing resources in the cloud can be instantaneous, which may not be the case with regular project management. With the cloud computing, one can start with a very small number of resources and grow as needed, paying only for what was used.

The system, method and/or techniques of the present disclosure may display computer-executable user tasks (jobs) running on a cloud environment, including estimated costs and duration for the completion of the current set of tasks (and the resources taken for this computation), while conveying prioritization and interdependency information as well as time/cost uncertainty. The system, method and/or techniques of the present disclosure may provide automatic allocation suggestions according to preset criteria (e.g., low cost, shorter time) or business constraints informed by the user, and also may allow the user experiment with different configurations considering external, contextual, and/or temporary constraints (e.g., reordering future tasks, temporarily allocating more resources to a specific task). These modifications can be made directly on running jobs and/or future jobs, or they can be explored in a sandbox environment (e.g., the user is free to experiment before committing to any changes). Explored and suggested configurations can be stored on a storage device for later comparison and selection. In one aspect, this approach is also agnostic from the cloud business model, whether it is an IaaS (Infrastructure as a Service), a PaaS (Platform as a Service) or a SaaS (Software as a Service). In SaaS environments, in which new Virtual Machines or Containers must be provisioned, the system, method and/or techniques of the present disclosure may be implemented by considering that a delay might exist between a scaling operation being requested by the user and its actual completion. The charging model may be added in a consistent way into the tool herein disclosed. In PaaS and SaaS environments, in which the provisioning of new instances is abstracted, a similar approach can be taken, enabling correct execution.

A visual tool (e.g., apparatus) may display relevant information to the user concerning computer-executable job allocation, and provide one or more tools for job management and to explore different job configurations for computer-executable jobs (processes). A support system may aid users in job management of computer-executable jobs, and perform (1) constant monitoring of business constraints, (2) cost estimates and (3) convey task duration uncertainty associated with such computer-executable jobs. Methods may be provided for semi-automatic job configuration and monitoring in computer infrastructure such as the cloud, including estimating and updating job duration and uncertainty, as well as generating a plurality of possible job configurations according to business constraints.

FIG. 1 is a diagram illustrating components of a system in one embodiment of the present disclosure. User device 102 hosts the front-end functionality of a tool 104, and functions as a point that a user 106 may interact with the tool 104 of the present disclosure in one embodiment that, e.g., provide visualization capabilities. The user device 102 hosting the front-end functionality may communicate with a computational infrastructure 108 via a communication channel 110, network components, that allows for the front-end and back-end communications. The computational infrastructure 108 may host computing resources and execute user applications and jobs. An infrastructure management system 112 manages resources that are available to users 106 to run their computer-implemented or computer-executable tasks. The infrastructure management system 112 may also host the back-end component of the tool 104 of the present disclosure, which may calculate, for instance, the run time estimations of the user tasks, and related costs for running them and uncertainty associated with the estimations. Thus, for example, part of the tool 104 may be deployed in the infrastructure 112, and another part of the tool 104 may be deployed in the user device 102.

A user interface, for example, displayed via the user device 102, in one embodiment conveys all information relevant to job configuration and monitoring, for example, the order of job allocations, estimated completion times, the amount of computational resources being used, total estimated cost, and so on.

Figure 2:
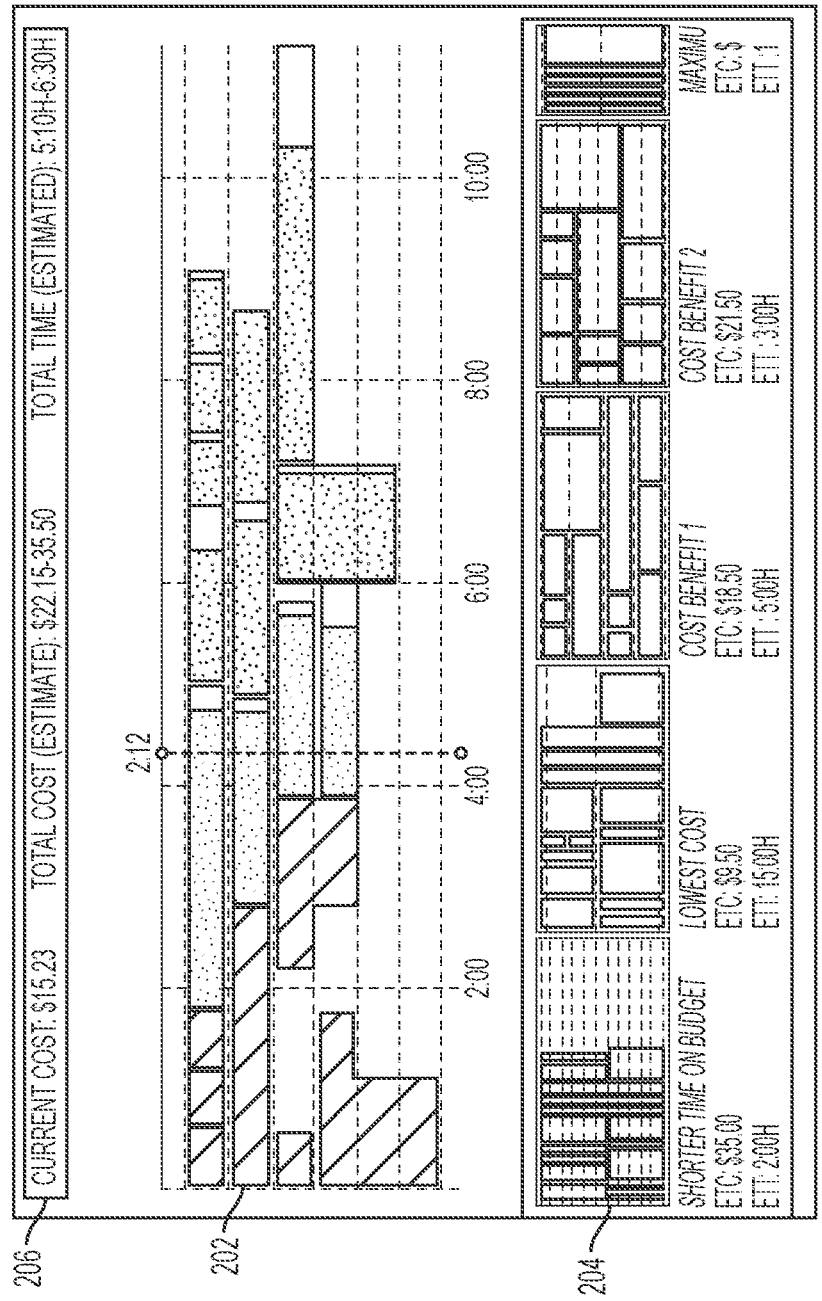
FIG. 2 shows an example user interface display featuring a job allocation chart and a configuration gallery in one embodiment of the present disclosure.

FIG. 2 shows an example user interface display featuring a job allocation chart and a configuration gallery, a collection of possible re-configurations, in one embodiment of the present disclosure. The user interface display in one embodiment may display a timeline of allocated jobs 202. The user interface display may also display a collection of possible re-configurations 204, referred to also as a configuration gallery, each for example, with estimated time and cost.

Figure 3:
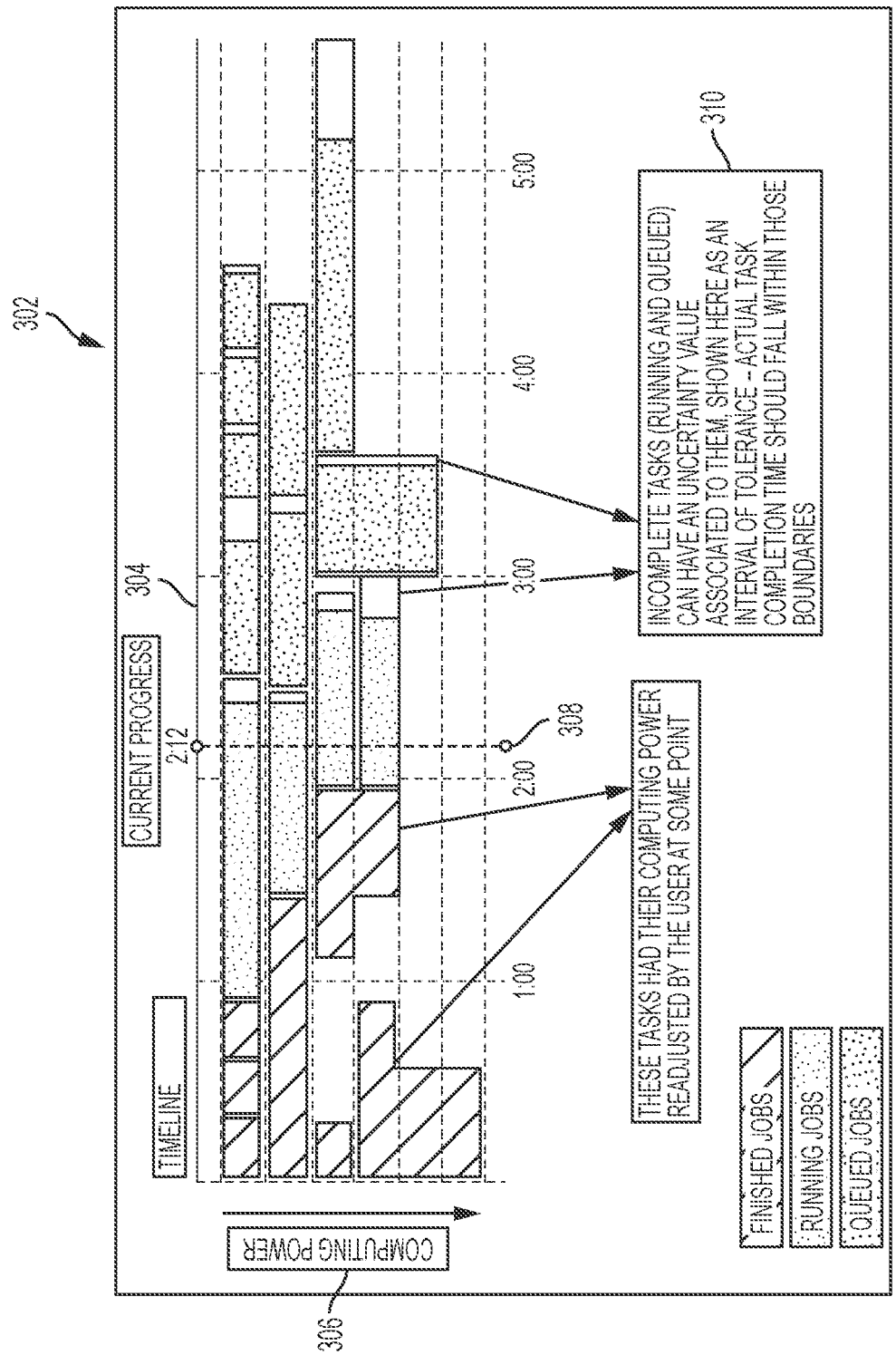
FIG. 3 illustrates an example element shown in a user interface display of the present disclosure in one embodiment.

FIG. 3 illustrates an example element shown in a user interface display of the present disclosure in one embodiment. A job allocation chart 302, for example, may be presented or displayed on the user interface display as a Gantt-like chart to show and/or manipulate job allocation (job allocation chart). An example job allocation chart is also shown in FIG. 2 at 202. The job allocation chart 302 associates one dimension 304 to time to task completion (in this example, the horizontal axis) and another dimension 306 to computing power associated with tasks (in this example, the vertical axis). In this example, the job lineup is reflected as a combination of the two dimensions, with task duration and computational power reserved for that task. While the example shows a 2-dimensional embodiment, other embodiments are also possible, e.g., a table-based listing of jobs that may be compatible with command-line interfaces.

Both future and current jobs may have computational power readjusted by the user (e.g., increase or decrease), which in turn prompts the system to re-estimate completion time. The example in FIG. 3 also shows examples of finished jobs (on the left) that had computational power readjusted in the midst of execution—one was reduced to ⅓ of the original computing set, and another one was doubled. For instance, the vertical dimension, in this representation, maps to computational power/resources; thus, the variations in vertical length correspond to changes in computer resource allocation. The readjustment policy can take on many variations, to be defined by the service provider. Examples of readjustment policies may include: (i) preset computational resource packages (e.g., small, medium, large, shown in FIG. 4), (ii) minimum set, plus custom continuous increment (e.g., 1.5, 1.8), (iii) minimum set, plus discrete increments (e.g., 2, 3, 4).

Figure 4:
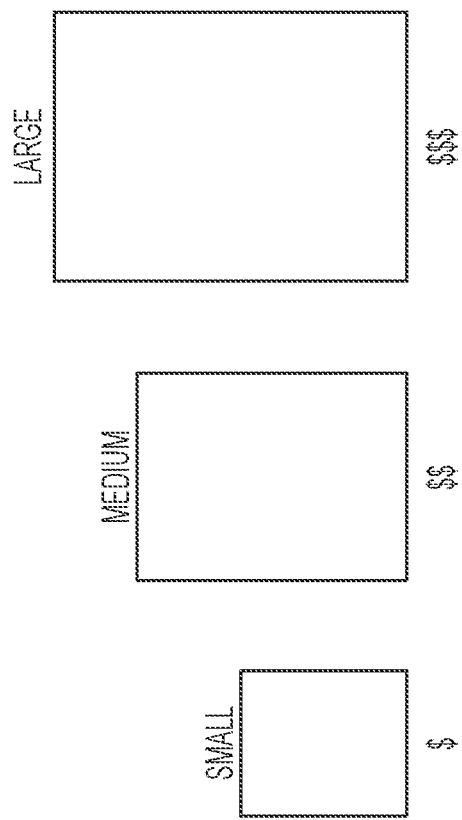
FIG. 4 shows example of preset increments in one embodiment of the present disclosure.

FIG. 4 shows example of preset increments in one embodiment of the present disclosure. The figure shows a simplified pricing model to facilitate mapping of computational resources to tasks: tasks can be given one out of the three indicated levels of resources, which are, in turn, charged accordingly. More computational resources may correspond to higher task priority, or that a certain task requires more power to be completed. Other possible strategies may involve providing other discrete increments in computational power not limited to the 3 levels indicated in FIG. 4, or even a continuous interval.

Referring to FIG. 3, tasks can also be repositioned along the timeline 304, to anticipate or postpone their start, e.g., referred to as reprioritization. Reprioritization may also include changing a task's associated computation power, for example, by changing the position of the task along the computing power dimension (e.g., vertical dimension in this example). The system in one embodiment allows users to adjust task priority, by pushing them to start earlier in the timeline. The system automatically readjusts the computing resources for the target tasks, may push other tasks further in the timeline (in particular if there are any dependencies), and provide visual feedback on the reprioritization of the task, e.g., depicting the new prioritization of the task and informing users of the associated changes in cost and time completion.

This view may also display the current execution time 308 (current progress), and the status of the current jobs. In this example, status are "finished", "running" and "queued", but depending on the application status may also include others, such as "error" (when a job has crashed before completion), or any other application-specific outcomes (e.g. true/false/inconclusive). In one embodiment, the display may be presented in different color codes or visual cues to distinguish different status. Different status may also be represented through icons, for instance.

There may be uncertainty associated to the execution of tasks in cloud or like environments. When the task is well understood and the execution parameters are known (for instance, as in SaaS models), it may be possible to have good estimates for task duration. Nonetheless, that is not always the case, and unknown factors aside, the job duration itself might be inherently non-deterministic; computer system infrastructure such as the cloud infrastructure might also introduce another point of uncertainty (for instance, when spot instances are used). To address this, the methodology in one embodiment of the present disclosure may associate an estimated uncertainty range of time completion for current and future jobs, shown in this example, as an extension of the tasks in different visual cue, e.g., lighter tone (from min to max), e.g., at 310. For instance, as shown at 310, a visual bar indicative of job duration may be embedded or contained within a visual bar that includes an uncertainty range. As another example, the uncertainty may also be represented by ticked lines (like boxplot whiskers), and define an interval within which the final execution time is likely to be. This uncertainty can be estimated from historical data, and have statistical and machine learning techniques applied to it to calculate its range. The system of the present disclosure not only supports working with uncertainty but that it can convey this information to the user. The uncertainty model may be used as a black box. Time uncertainty also implicates in cost uncertainty with non-linear variations that are not intuitive or easily forecasted by users. Users may be informed of the possible range of costs that derive from these variations. FIG. 2, for example, shows literal values at 206.

Jobs running in parallel environments tend to be independent from each other; however, some tasks may be related to each other (e.g., tasks that are associated with the same problem-set), and some of these might also have direct interdependencies (i.e., one task requires another to be processed). When task dependencies exist, those dependencies may be taken into account in the positioning of tasks along the timeline: e.g., repositioning tasks with dependencies propagates the readjustments accordingly or limits the possible readjustment to account for forward dependency. Internally in computer memory representation, such dependencies can be represented, for example, as directed acyclic graphs. In such a case, applying an algorithm known as topological sorting may allow the system to know which tasks must be rearranged to account for the new priorities.

As described above, a methodology in one embodiment may also provide for scheduling gallery, reprioritization and sandbox capabilities. In the job allocation chart (e.g., FIG. 3, 302), the area taken over by tasks on this diagram represents a rough estimate of total cost. Nonetheless, pricing may be still subjected to non-intuitive, non-linear variations due to cloud pricing models (e.g., pricing for the hour, and thus a task taking 20 minutes or 40 minutes would end up costing the same), and therefore requires cost to be explored further for increased understanding, and conscientious task reprioritizing. Typically users may like to reconfigure tasks for: (1) better cost benefit—meaning reduce the amount of computational resources consumed, and thus increasing completion time; (2) faster completion—meaning increasing the amount of computational resources consumed, and thus increasing total price; (3) a trade-off between both above; (4) increasing the reliability for execution time estimations.

In automatic job scheduling and configuration, e.g., in the cloud, users may have complex exceptions and subjective criteria, e.g.: "I always want to spend as little as possible, regardless of turnaround unless it is a really short and high priority job, in which I will consider case-by-case whether I am willing to spend the money for the speed boost." The scheduling or reprioritization techniques in the present disclosure may take into consideration such complex and subject criteria in scheduling and reprioritizing jobs.

Figure 5:
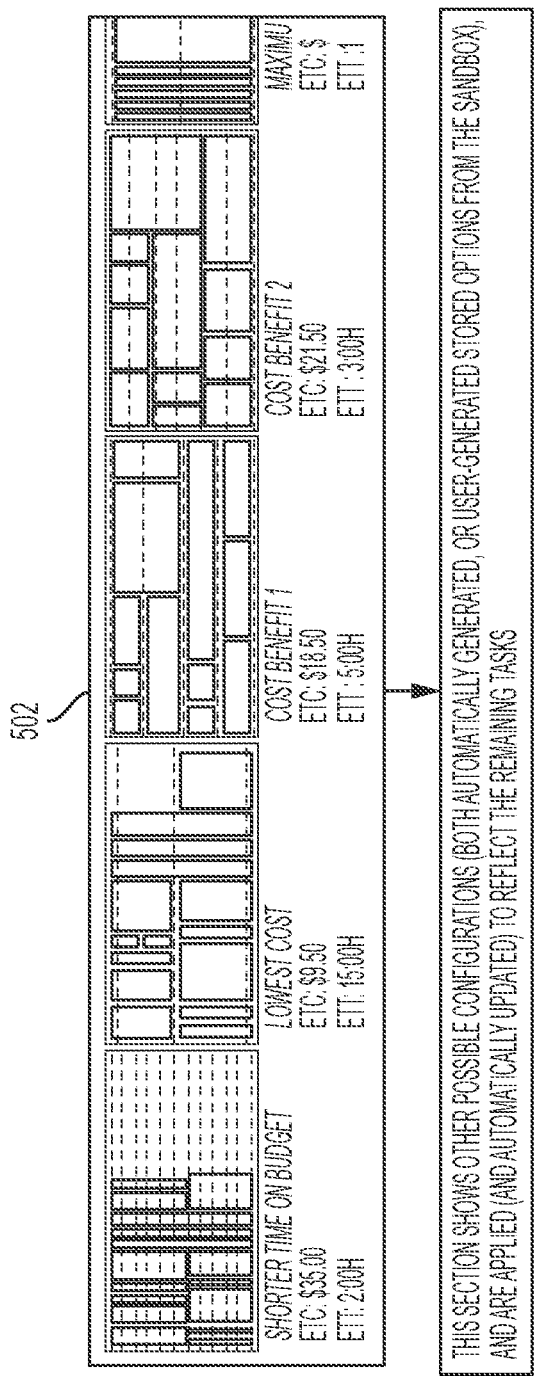
FIG. 5 illustrates an example user interface display showing a scheduling gallery in one embodiment of the present disclosure.

FIG. 5 illustrates an example user interface display showing a scheduling gallery in one embodiment of the present disclosure. In one embodiment, a hybrid strategy is disclosed that provides users with several automatically-generated allocation alternatives, and displays them together with estimated pricing and turnaround time alongside a graphical representation of the allocation, on the scheduling gallery, for example, shown in FIG. 5. This graphical representation 502 in one embodiment conveys how the prioritization was carried by the automatic methods; it also helps provide a memorable identity for each option. Users may choose one of the options, and carry out a task micro-management later if necessary. These alternatives give users a range of price/turnaround variations on which to play with. For instance, for each of the graphical representation, estimated total time (ETT) and estimated total cost (ETC) may be displayed or presented. Users may also explore with different configurations, in a sandbox; e.g., users may start from a suggested configuration, and apply several changes. Estimated turnaround and prices are re-estimated after every modification, but none of the changes are applied until the user is done exploring with allocation possibilities and is satisfied with the final result. Sandbox configurations can also be stored in the configuration gallery, alongside automatic suggestions. The scheduling gallery 502 in one embodiment thus may show possible configurations other than the shown job allocation chart (e.g., FIG. 3, 302), which may include automatically generated and/or user-generated stored options from the sandbox, and are applied and automatically updated to reflect the remaining tasks.

For steering scenarios, in which a series of tasks are running, the configuration gallery in one embodiment updates itself to reflect allocation suggestions only to the remaining tasks (e.g., running and queued tasks). Given a set of business constraints that might optionally be informed, the system of the present disclosure may also generate warnings and provide suggestions when one or more of these business constraints are compromised, or when better scheduling configurations are made available (e.g., when inexpensive spot instances are available).

Figure 6:
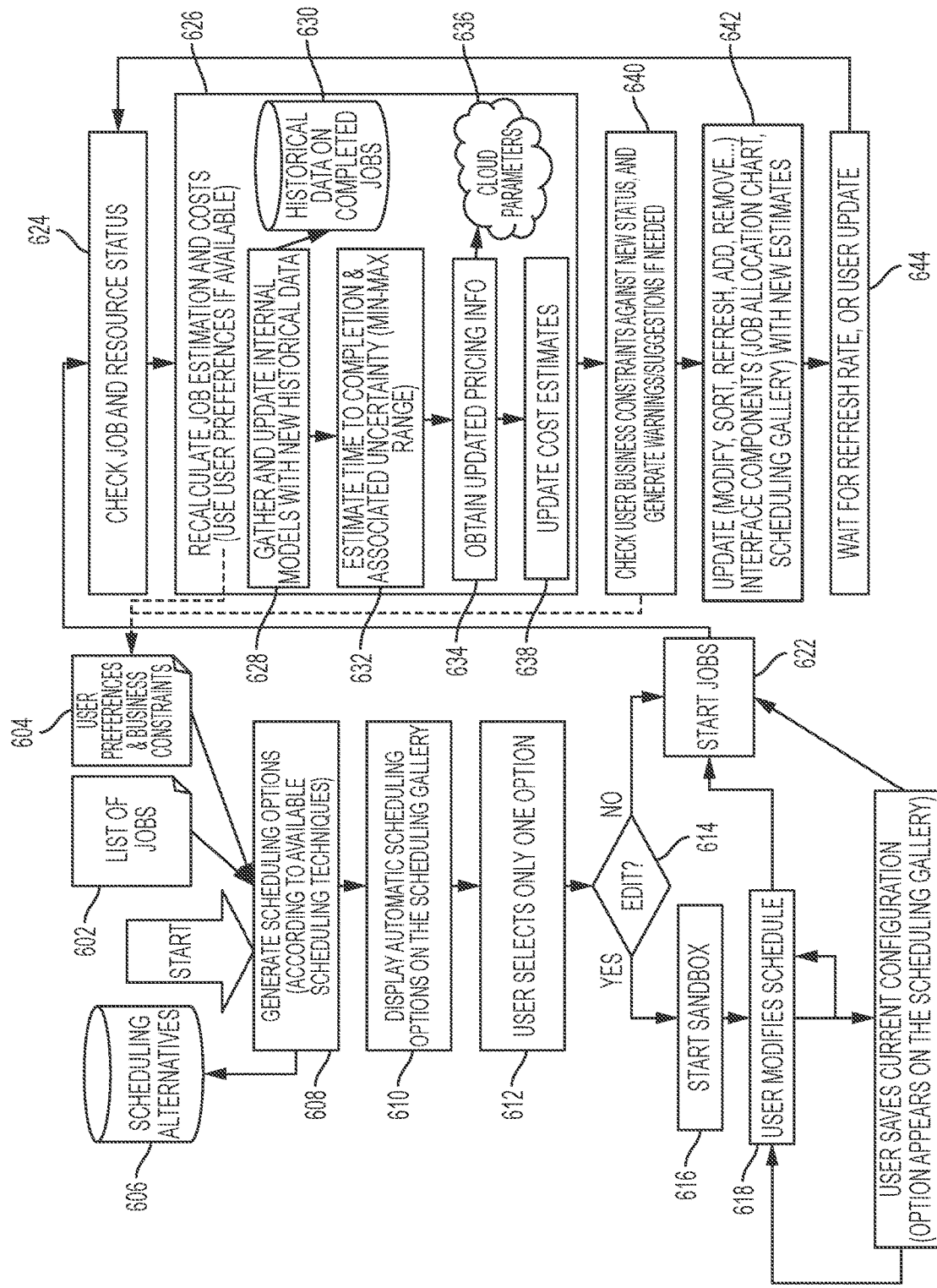
FIG. 6 is a diagram illustrating a method of the present disclosure in one embodiment.

FIG. 6 is a diagram illustrating a method of the present disclosure in one embodiment. The method of the present disclosure in one embodiment allows users determine the cost with levels of uncertainty in terms of prices and quality of service (QoS) that are exposed to the end-user and offers options to the users to choose other resource configurations with different costs and/or times of computer-executed job's completion. The method in one embodiment allows users to receive and interact with a list of resource configuration options that contain uncertainty information for cost and time to complete their computer-executable tasks.

At 602, a list of jobs submitted is received. At 604, user preferences and constraints are received. At 608, scheduling options are generated, for example, according to available optimization techniques. A job allocation option to be determined to be most optimal may be identified along with one or more alternative job allocation options. Hence, the generated options may include a plurality of different job allocation schedules. The generated options are stored in a storage device 606.

At 610, the automatic scheduling options are displayed on a user interface display device. The user interface display allows the user to select a job allocation option to run on a computer system, for example, the cloud. The user interface display also allows the user to open a sandbox environment. For example, a graphical icon may be displayed for allowing a user to select a sandbox environment.

At 614, it is determined whether the user chose to open a sandbox environment to edit the job allocation options or whether the user chose to run one of the automatically provided job allocation options. Responsive to determining that the user chose to edit the automatically provided job allocation options, a sandbox environment may be executed and started at 616. For instance, the user may be allowed to redefine the job priorities, via a visual interface (e.g., drag and drop job positions in a scheduling chart), or change the required number of processors to run the job, which may be done using the same visual interface of job prioritization definition. This sandbox modification in one embodiment generates new estimations of time and cost and their respective accuracy levels.

At 618, the user is allowed to modify a job allocation option. For instance, via the user interface display, the user may select one of the job allocations options, and select to modify it. The user modified job allocation option is received and may be stored. At 620, the user modified current configuration of the job allocation option may be displayed in a scheduling gallery, e.g., with one or more of other job allocation options. In one aspect, the sandbox environment is a simulator. Its interface may include the graphics such as those shown in FIG. 2. The sandbox environment may show what the task could look like if it was readjusted, as well calculate the new variations in time/cost (e.g., FIG. 2 at 206), but does not effectively apply those changes to the tasks running in a computer system infrastructure, for example, in the cloud. It is referred to as "sandbox" because it is an environment where users can "safely explore" the variations in time and cost before actually executing the jobs as allocated, e.g., and thus before incurring any actual cost. Users may also want to compare two or more task allocation scenarios; for example, referring to FIG. 2 at 204, the user may see previous suggested (automatic) and customized (manual) allocation scenarios, which can be also selected (retrieved) at any time. When the user is in the sandbox environment, the changes are not forwarded to the computer system that runs those jobs, for example, the cloud server, until the user selects to apply those changes.

The user may start job processing and begin steering. For instance, the user interface display may provide a selectable icon to select a job allocation option to execute. Responsive to the user selecting a job allocation option to execute, at 622, the jobs in the job allocation option are started or executed on a computer system infrastructure, e.g., the cloud. For instance, the jobs may be started according to the user modified configuration, if the user chose to edit the provided job allocation. If at 614, the user chose one of the automatically determined job allocation options, the user chosen option is started or executed at 622.

At 624, the job execution and resource status of the computer system infrastructure are monitored. For example, users may select to monitor the progress of tasks periodically, e.g., by executing an automatic monitoring tool. User may specify rules and conditions at 604 (e.g., "send an alert if costs are estimated to go over $X") for notification and/or automatic reprioritization, actions which may be performed at 640 and 642 taking one or more preferences and/or constraints 604 into account.

At 626, based on the monitoring of the job execution and resource status, job estimation and costs may be recomputed. This processing may also use user preferences if available. This processing at 626 may include gathering and updating internal models with historical data at 628, for example, from historical data on completed jobs 630. Internal models refer to computing structures that define how a job behaves under different configurations. For instance, an internal model can define that the estimated execution of a job increases linearly with the number of processors available to run it. An internal model can also define that, the more time the job is estimated to run, the less accurate is the estimation. An internal model describes or indicates how a job behaves by changing its configuration such as number of allocated processors and execution time.

The processing at 626 may also include estimating time to completion and associated uncertainty at 632. This may include collecting execution times of all similar jobs submitted by the user and calculating the average, minimum and maximum of all collected data. The calculating of the average, minimum and maximum of all collected data may be performed via time series analysis, considering for example that users tend to submit similar jobs in a period of time. In another aspect, the estimating time to completion and associated uncertainty at 632 may include determining that the user application is composed of a series of regular steps that take the same amount of time to execute. By doing so, it is possible to know the total execution time of the application with a few execution steps.

The processing at 626 may also include obtaining and updating pricing information at 634. At 634, the method of the present disclosure may collect data from one or more cloud providers 636 for instances such as virtual and physical machines via Representational State Transfer (REST) application programming interfaces (APIs) published by those providers 636. Some providers may also offer dynamic pricing for resources via the use of auctions. The current price of these resources may be also collected at 634.

The processing at 626 may also include updating cost estimates at 638. Updating cost estimates at 638 in one embodiment merges the information produced at 632 and 634. The method at 638 may obtain from the user the number and type of resources required to run the user application and map how much time an application would take to run using these resources by comparing the number of resources used by jobs considered at 632 and the number of resources defined by the user. With this number of resources and estimated execution time, the processing at 638 in one embodiment uses information produced at 634 to calculate for how long the required resources need to be used. The uncertainty of the cost may be proportional to the uncertainty of the execution times, and uncertainty of the prices of cloud resources may depend on the pricing model of the cloud provider.

Uncertainty associated with the estimation of time and cost may be determined at least based on analyzing internal computing structures associated with historical jobs. For example, the cost may be determined as follows: as an example, an Instance-based learning (IBL) approach based on k-nearest neighbors (KNN) may be used for estimating job execution times. In this example, given a job's characteristics, historical data may be used to estimate its execution time as follows: every time a job finishes running, all of its characteristics (such as number of processors, type of application, submission time, and/or other characteristics, along with its total run time) may be added to a database. Then, when a new job arises, similar jobs may be found by calculating the distances between job characteristics. Once the K neighbors are found, a regression technique may be used to estimate the run time of the new job. In such a case, the expected run time becomes a regression over the k neighbors of the query. Hence, the uncertainty can be calculated by finding the variance of the runtimes of the neighbors: the higher the variance, the higher the uncertainty.

Another approach for estimating the runtime is by using a method of finding the average between the run times of the last two jobs submitted by this user. An example follows: for instance, assume that k=3 and that the runtimes of the neighbors are 10, 15, and 20 seconds. Assume, also, that the regression method is the arithmetic mean and that all the characteristics used to estimate the neighbors have the same weights. In that example, the estimated runtime is (10+15+20)/3=45/3=15 seconds. The variance, then, may be determined as ((10−15)2+(15−15)2+(20−15)**2)/(3−1)=50/2=25 squared seconds. Taking the variance's square root produces the standard deviation, which has the same unit of the mean. Thresholds of uncertain or certain predictions may be configured, for example, using the standard deviation and/or the mean. For instance, the higher the variance, the higher the likelihood of the prediction being uncertain or off. A user for example, may input or specify the threshold. In another aspect, the threshold may be configured automatically. An embodiment of the present disclosure thus exposes the uncertainty to the user in an intuitive way.

At 640, business constraints and current or new status are checked, and warnings and/or suggestions are generated and presented to the user based on the checking. For instance, given a collection of constrains and rules 604, for example, in a data format that is ingestible or represented for computer interpretation, each constraint may be iterated and applied to the current job and/or resource status.

At 642, the user interface components are updated, e.g., modified, sorted, refreshed, added, and/or removed, with new estimates. For example, the scheduling gallery, job allocation chart, time and/or cost estimates, displayed on the user interface are presented with new estimates.

At 644, after a periodic interval, for example, every x time units or a user update, the processing logic returns to 624 for monitoring of job execution and resource status.

A visualization or user interface of the present disclosure in one embodiment, an example of which is shown in FIG. 2, FIG. 3 and FIG. 5, displays the following components to the user: job queue, estimated time of completion, estimated cost, amount of computational resources used, job status, uncertainty related to time of completion, uncertainty related to cost, timeline, dependencies, scheduling alternatives (automatic and user-generated from the sandbox) with relevant information from each (e.g. cost, time, description, and/or others).

In one embodiment of the present disclosure, the user interface allows a user to perform the following user functionalities, e.g., tasks users can perform with a system of the present disclosure: add and remove tasks (computer-executed tasks), move and reprioritize tasks, readjust job computational power for running and future tasks, sandbox, accept automatic adjustment/suggestion based on informed business constraints, and user preferences.

The system of the present disclosure, in one embodiment, performs the following functionalities automatically: automatically updating after user modifications; monitoring business constraints; monitoring pricing, calculating automatic scheduling suggestions; readjusting estimated time of completion and/or cost and uncertainty using historical data; updating the user interface regularly with latest job queue, cloud and/or cost status; suggesting rescheduling (while running jobs), in view of new premises and/or constraints.

A system, method and/or techniques are disclosed that allow the user to steer the allocation of tasks and the amount of the resources used. A single provide, e.g., of cloud services such as software as a service (SaaS) or other services that may want to give visibility of the incurred costs of running processing tasks on the cloud may implement the system, method and/or techniques presented herein. In one aspect, the present disclosure may address the problem of making it clear for users the amount the users are paying to use the resources provided in the computer system infrastructure. This, for example, may imply that if the user is not using a resource, then the user is not paying for that resource. An approach disclosed in the present disclosure may assume a charging model in which users are charged only when computation happens. In another aspect, monitoring of computer-executed jobs may be provided, for example, to present better cost estimates to users, and let them act accordingly. For instance, a system in one embodiment of the present disclosure may monitor cloud environments to provide relevant information to the user. In one aspect, the system may use virtual machines to realize the functionalities. In one aspect, the system, method and/or techniques handle the execution of cloud-based applications and with scaling the applications based on user input. The system, method and/or techniques of the present disclosure may able to not only decide the amount of resources allocated to each computer-executed task, but can also view when each computer-executed task was executed and which computer-executed tasks executed alongside these. Uncertainty may be represented and estimates may be improved based on the passing of time. In one aspect, the user is allowed to decide whether or not to perform the scaling operations, making it transparent for the user the amount of resources used so far and estimated costs in terms of time and money for the rest of the computation, and hence the user is provided with better visibility of such costs to the user.

Figure 7:
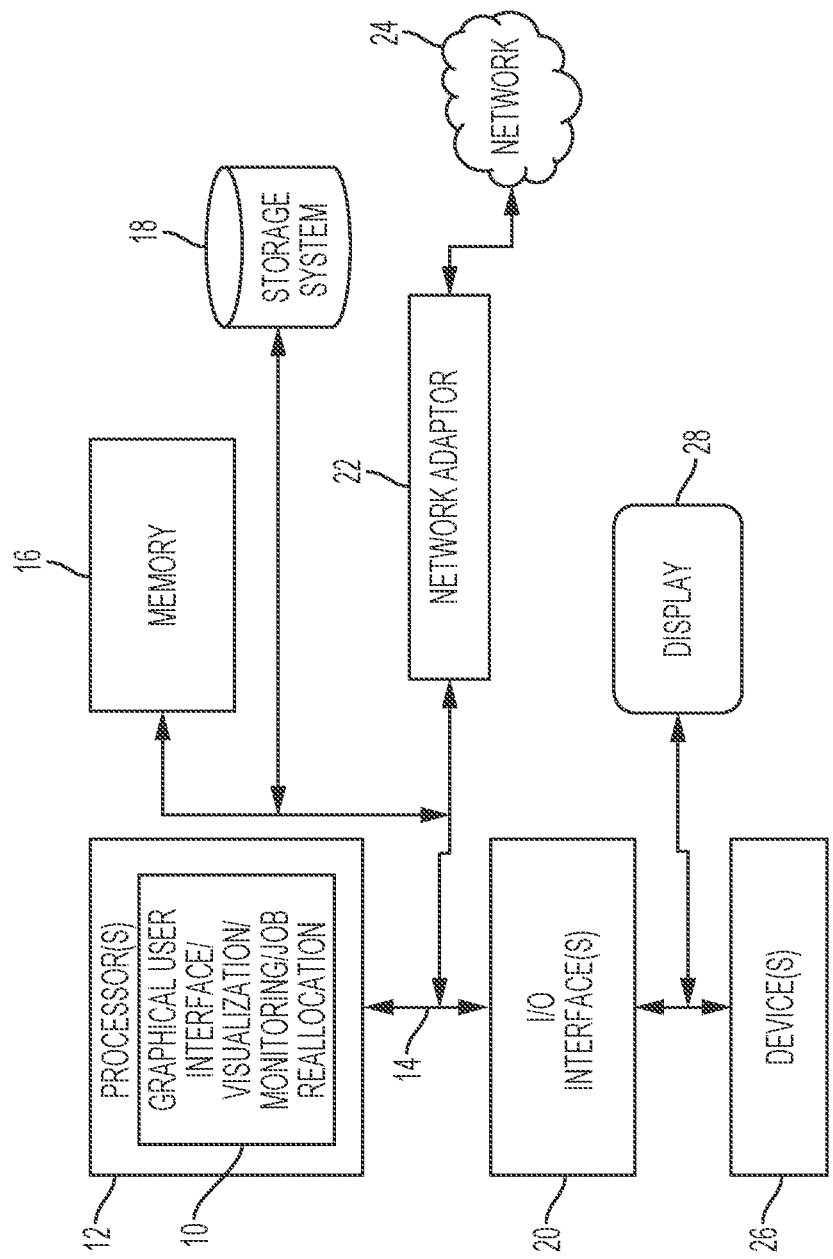
FIG. 7 illustrates a schematic of an example computer or processing system that may implement a computer-implemented process readjustment system that allows a user to readjust allocations of computer-executable jobs or processes executing or running, for example, in the cloud infrastructure, in one embodiment of the present disclosure.

FIG. 7 illustrates a schematic of an example computer or processing system that may implement a computer-implemented process readjustment system that allows a user to readjust allocations of computer-executable job or process executing or running, for example, in the cloud infrastructure, in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include one or more modules 10 that perform the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of providing a user interface supporting user decision making and readjusting of computer job execution allocations, comprising:
   receiving a list of computer executable jobs for execution on a computing environment;
   receiving one or more user preferences and a plurality of constraints associated with the list of computer executable jobs, wherein the plurality of constraints comprises pricing and turnaround time;
   generating a plurality of execution scheduling options for the list of computer executable jobs;
   providing a visualization comprising at least the plurality of execution scheduling options with corresponding time and cost estimates;
   providing a sandbox environment for editing one or more of the plurality of execution scheduling options, wherein a user may use the sandbox to explore variations in time and cost by reconfiguring the scheduling options;
   receiving a user selection of an execution scheduling option from the plurality of execution scheduling options; and
   iteratively performing:
      monitoring execution of the computer executable jobs allocated in the execution scheduling option selected by the user;

monitoring a current resource status of the computing environment while the computer executable jobs are executing;

determining estimation of time and cost of running one or more of the computer executable jobs based on the monitoring of the execution and the current resource status;

determining uncertainty associated with the estimation of time and cost of incomplete jobs at least based on analyzing internal computing structures associated with historical jobs, wherein incomplete jobs comprises running and queued jobs;

checking the constraints against the current resource status, each constraint may be applied to the current resource status to generate a warning to the user responsive to at least one of the constraints being compromised; and allowing updating, during the execution, of the visualization associated with the generated plurality of execution scheduling options and scheduling options stored by the user using the sandbox environment with updates to the plurality of execution scheduling options based on the estimation of time and cost and the uncertainty of remaining incomplete jobs.

2. The method of claim 1, further comprising storing the plurality of execution scheduling options on a storage device.

3. The method of claim 1, wherein the visualization comprises a plurality of charts presenting the plurality of execution scheduling options with a timeline, cost estimate and time estimate for completion, current execution time and status of currently executing jobs.

4. The method of claim 3, wherein the visualization further comprises amount of computational resources used, uncertainty related to time of completion, uncertainty related to cost, wherein an alert is generated responsive to determining that one or more of the uncertainty related to time of completion and the uncertainty related to cost exceeds a predefined thresholds level.

5. The method of claim 3, wherein the plurality of charts comprises at least one alternative scheduling option.

6. The method of claim 1, further including:

responsive to the user editing the one or more of the plurality of execution scheduling options via the sandbox environment, comparing the one or more edited scheduling options and the provided execution scheduling options, and storing the one or more of the plurality of edited execution scheduling options responsive to a selection from the user to save the edited execution scheduling option, allowing updating of the visualization to include the one or more of the plurality of execution scheduling options edited by the user with corresponding time and cost estimates.

7. A computer program product for providing a user interface supporting user decision making and readjusting of computer job execution allocations, the computer program product comprising a computer readable storage medium having program instructions embodied therewith, wherein the computer readable storage medium is not a transitory signal per se, the program instructions readable by a device to cause the device to perform a method comprising:

receiving a list of computer executable jobs for execution on a computing environment;

receiving one or more user preferences and a plurality of constraints associated with the list of computer executable jobs, wherein the plurality of constraints comprises pricing and turnaround time;

generating a plurality of execution scheduling options for the list of computer executable jobs;

providing a visualization comprising at least the plurality of execution scheduling options with corresponding time and cost estimates;

providing a sandbox environment for editing one or more of the plurality of execution scheduling options, wherein a user may use the sandbox to explore variations in time and cost by reconfiguring the scheduling options;

wherein the device is further caused to perform:

receiving a user selection of an execution scheduling option from the plurality of execution scheduling options; and iteratively perform:

monitoring execution of the computer executable jobs allocated in the execution scheduling option selected by the user;

monitoring a current resource status of the computing environment while the computer executable jobs are executing;

determining estimation of time and cost of running one or more of the computer executable jobs based on the monitoring of the execution and the current resource status;

determining uncertainty associated with the estimation of time and cost of incomplete jobs at least based on analyzing internal computing structures associated with historical jobs, wherein incomplete jobs comprises running and queued jobs;

checking the constraints against the current resource status, each constraint may be applied to the current resource status to generate a warning to the user responsive to at least one of the constraints being compromised; and allowing updating, during the execution, of the visualization associated with the generated plurality of execution scheduling options and scheduling options stored by the user using the sandbox environment with updates to the plurality of execution scheduling options based on the estimation of time and cost and the uncertainty of remaining incomplete jobs.

8. The computer program product of claim 7, further comprising storing the plurality of execution scheduling options on a storage device.

9. The computer program product of claim 7, wherein the visualization comprises a plurality of charts displaying the plurality of execution scheduling options with a timeline, cost estimate and time estimate for completion, current execution time and status of currently executing jobs.

10. The computer program product of claim 9, wherein the visualization further comprises amount of computational resources used, uncertainty related to time of completion, uncertainty related to cost, wherein an alert is generated responsive to determining that one or more of the uncertainty related to time of completion and the uncertainty related to cost exceeds a predefined thresholds level.

11. The computer program product of claim 9, wherein the plurality of charts comprises at least one alternative scheduling option.

12. The computer program product of claim 7, wherein the device is further caused to perform:

responsive to the user editing the one or more of the plurality of execution scheduling options via the sandbox environment, comparing the one or more edited scheduling options and the provided execution scheduling options, and storing the one or more of the plurality of edited execution scheduling options responsive to a selection from the user to save the edited execution scheduling option, allowing updating of the visualization to include the one or more of the plurality of execution scheduling options edited by the user with corresponding time and cost estimates.

13. A system of providing a user interface supporting user decision making and readjusting of computer job execution allocations, comprising:

at least one processor operable to receive a list of computer executable jobs for execution on a computing environment comprising a pool of configurable computing resources, the at least one processor further operable to receive one or more user preferences and a plurality of constraints associated with the list of computer executable jobs, wherein the plurality of constraints comprises pricing and turnaround time the at least one processor further operable to generate a plurality of execution scheduling options for the list of computer executable jobs;

a storage device coupled to the at least one processor and further operable to store the plurality of execution scheduling options;

the at least one processor further operable to a visualization comprising at least the plurality of execution scheduling options with corresponding time and cost estimates, the at least one processor further operable to provide a sandbox environment for editing one or more of the plurality of execution scheduling options, wherein a user may use the sandbox to explore variations in time and cost by reconfiguring the scheduling options, wherein the at least one processor is further operable to iteratively perform:

monitoring execution of the computer executable jobs allocated in the execution scheduling option selected by the user;

monitoring a current resource status of the computing environment while the computer executable jobs are executing;

determining estimation of time and cost of running one or more of the computer executable jobs based on the monitoring of the execution and the current resource status;

determining uncertainty associated with the estimation of time and cost of incomplete jobs at least based on analyzing internal computing structures associated with historical jobs, wherein incomplete jobs comprises running and queued jobs;

checking the constraints against the current resource status, each constraint may be applied to the current resource status to generate a warning to the user responsive to at least one of the constraints being compromised; and allowing updating, during the execution, of the visualization associated with the generated plurality of execution scheduling options and scheduling options stored by the user using the sandbox environment with updates to the plurality of execution scheduling options based on the estimation of time and cost and the uncertainty of remaining incomplete jobs.

14. The system of claim 13, wherein the visualization comprises a plurality of charts displaying the plurality of execution scheduling options with a timeline, cost estimate and time estimate for completion, current execution time and status of currently executing jobs.

15. The system of claim 14, wherein the visualization further comprises amount of computational resources used, uncertainty related to time of completion, uncertainty related to cost, wherein an alert is generated responsive to determining that one or more of the uncertainty related to time of completion and the uncertainty related to cost exceeds a predefined thresholds level.

16. The system of claim 14, wherein the plurality of charts comprises at least one alternative scheduling option.

17. The system of claim 13, wherein responsive to the user editing the one or more of the plurality of execution scheduling options via the sandbox environment, the at least one processor further operable to compare the one or more edited scheduling options and the provided execution scheduling options, and store the one or more of the plurality of execution scheduling options responsive to a selection from the user to save the edited execution scheduling option, the at least one processor further operable to allow updating of the visualization to include the one or more of the plurality of execution scheduling options edited by the user with corresponding time and cost estimates.

* * * * *